(12) United States Patent
Strehl

(10) Patent No.: US 9,409,829 B2
(45) Date of Patent: Aug. 9, 2016

(54) USE OF PSEUDOMONAS DIAZOTROPHICUS AS A SOIL INOCULANT

(71) Applicant: TEKS Inc., Monroe Center, IL (US)

(72) Inventor: Taylor Strehl, Monroe Center, IL (US)

(73) Assignee: TEKS Inc., Monroe Center, IL (US)

( * ) Notice: Subject to any disclaimer, the term of this patent is extended or adjusted under 35 U.S.C. 154(b) by 62 days.

(21) Appl. No.: 14/210,797

(22) Filed: Mar. 14, 2014

(65) Prior Publication Data
US 2014/0260463 A1 Sep. 18, 2014

Related U.S. Application Data

(60) Provisional application No. 61/790,597, filed on Mar. 15, 2013.

(51) Int. Cl.
*A01N 25/00* (2006.01)
*C05F 11/08* (2006.01)
*C05D 9/00* (2006.01)

(52) U.S. Cl.
CPC .. *C05F 11/08* (2013.01); *C05D 9/00* (2013.01)

(58) Field of Classification Search
None
See application file for complete search history.

(56) References Cited

U.S. PATENT DOCUMENTS 5,503,652 A * 4/1996 Kloepper ............... A01N 63/00
435/253.3

OTHER PUBLICATIONS

Oliveira et al. (Diazotrophyc rhizobacteria isolated from sugarcane can release amino acids in a synthetic culture medium, Biology and Fertility of Soils, 2011, 47(8), 957-62, ISSN: 0178-2762). Abs.*
Doty et al. (Diazotrophic endophytes of native black cottonwood and willow, Symbiosis, 2009, 47(1), 23-33, ISSN: 0334-5114, English).*
Jha et al. (Isolation, partial identification and application of diazotrophic rhizobacteria from traditional Indian rice cultivars, European Journal of Soil Biology, 2009, 45(1), 62-72, ISSN: 1164-5563, English).*
Koomnok et al. (Diazotroph endophytic bacteria in cultivated and wild rice in Thailand, ScienceAsia, 2007, 33(4), 429-435, ISSN: 1513-1874, English).*
Mineev et al. (Nitrogen balance in soil under table beet inoculated with bacteria of the genus *Pseudomonas*, Doklady Vsesoyuznoi Akaemii Sel'skokhozyaistvennykh Nauk imeni V.T. Lenina, 1992, (3), 7-12, ISSN 0042-9244, Russian).*
Watanabe et al. (A new nitrogen fixing species of pseudomonad: *Pseudomonas diazotrophisus* sp. Nov. Isolated from the root of wetland rice, Canadian Journal of Microbiology, 1987, 33(8), 670-8, ISSN 0008-4166, English).*
Naganandini et al. (Diversity analysis of pseudomonads in rice rhizosphere for multifaceted plant growth promotion, Acta Microbiologica et Immunologica Hungarica, 2011, 58940, 247-58, ISSN 1217-8950, English).*
Strehl, Microbial Soil Enhancement Final Report; Science Fair Project Report, Jun. 2010.
Taylor, et al.; Polar lipids of 'Pseudomonas diazotrophicus'; Oct. 8, 1992.
Watanabe et al.; A new nitrogen-fixing species of pseudomonad: *Pseudomonas diazotrophicus* sp. nov. isolated from the root of wetland rice; Canadian Journal of Microbiology; 1987; pp. 670-678.
Pepe, et al.; Dynamic of functional microbial groups during mesophilic composting of agro-industrial wastes and free-living (N2)-fixing bacteria application; Waste Management, vol. 33, Issue 7; 2013; pp. 1616-1625.
Shu, et al.; Abundance and diversity of nitrogen-fixing bacteria in rhizosphere and bulk paddy soil under different duration of organic management; World Journal of Microbiology and Biotechnology, vol. 28, Issue 2; 2012; pp. 493-503.
Mirza, et al.; Molecular characterization and PCR detection of a nitrogen-fixing Pseudomonas strain promoting rice growth; Biology and Fertility of Soils, vol. 43, Issue 1; 2006; pp. 163-170.
Muthukumarasamy, et al.; Natural association of Gluconacetobacter diazotrophicus and diazotrophic Acetobacter peroxydans with wetland rice; Systematic and Applied Microbiology, vol. 23, Issue 3; 2005; pp. 277-286.
Tripathi, et al.; Molecular characterization of a salt-tolerant bacterial community in the rice rhizosphere; Research in Microbiology, vol. 153, Issue 9; 2002; pp. 579-584.
Chan, et al., $N_2$-fixing pseudomonads and related soil bacteria; FEMS Microbiology Reviews, vol. 13, Issue 1; 1994; pp. 95-117.
Taylor, et al.; Polar lipids of a Pseudomonas diazotrophicus a; FEMS Microbiology Letters, vol. 106, Issue 1; 1993; pp. 65-69.
Kennedy, et al.; Biological nitrogen fixation in non-leguminous field crops: Recent advances; Plant and Soil, vol. 141, Issue 1; 1992; pp. 93-118.
Pimentel, et al.; Dinitrogen fixation and infection of grass leaves by Pseudomonas rubrisubalbicans and Herbaspirillum seropedicae; Plant and Soil, vol. 137, Issue 1; 1991; pp. 61-65.
Boonjawat, et al.; Biology of nitrogen-fixing Rhizobacteria; Plant and Soil, vol. 137, Issue 1; 1991; pp. 119-125.
Khammas, et al.; *Azospirillum irakense* sp. nov., a nitrogen-fixing bacterium associated with rice roots and rhizosphere soil; Research in Microbiology, vol. 140, Issue 9; 1989; pp. 679-693.
Khammas, et al.; *Azospirillum irakense* sp. nov., a nitrogen-fixing bacterium associated with rice roots and; Research in Microbiology, vol. 140, issue 8; 1989; pp. 679-693.

* cited by examiner

*Primary Examiner* — Alton Pryor
(74) *Attorney, Agent, or Firm* — Leydig, Voit & Mayer, Ltd.

(57) ABSTRACT

The invention provides an inoculant comprising *Pseudomonas diazotrophicus* and a carrier, which is useful for enhancing plant growth. The invention also provides a method of producing a plant which comprises applying an inoculant comprising *Pseudomonas diazotrophicus* and a carrier to plant or the growth medium of the plant.

15 Claims, 5 Drawing Sheets

USE OF PSEUDOMONAS DIAZOTROPHICUS AS A SOIL INOCULANT

CROSS-REFERENCE TO RELATED APPLICATIONS

This patent application claims the benefit of U.S. Provisional Patent Application No. 61/790,597, filed Mar. 15, 2013, which is incorporated by reference.

BACKGROUND OF THE INVENTION

Nitrogen is an essential plant nutrient which is required for the biosynthesis of nucleotides for DNA and RNA and amino acids for proteins. Although nitrogen composes nearly 78% of Earth's atmosphere, the majority is diatomic ($N_2$), which is not a useful form for plants. Although useful nitrogen compounds (e.g., ammonia) are widely produced through industrial chemical means as fertilizers, it is estimated that more than 4/5 of all useful nitrogen compounds produced on an annual basis are produced naturally, the vast majority of which is produced by diazotrophic microorganisms.

Diazotrophs are microorganisms that have the ability to convert diatomic nitrogen into nitrogen-containing compounds which can be used by plants. This process is known as biological nitrogen fixation, or simply nitrogen fixation. Biological nitrogen fixation can be modeled by the following chemical equation:

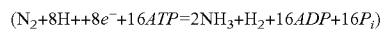

$$(N_2 + 8H^+ + 8e^- + 16ATP = 2NH_3 + H_2 + 16ADP + 16P_i)$$

Thus, during nitrogen fixation, two moles of ammonia are produced from one mole of nitrogen at the cost of sixteen moles of adenosine triphosphate (ATP).

Diazotrophs can be divided into two categories: symbiotic and free-living. Symbiotic diazotrophs form associations with plants or animals. For example, *Bradyrhizobium japonicum* is a gram negative, rod-shaped, nitrogen-fixing bacterium which develops a symbiosis with soybeans. *B. japonicum* belongs to the family, Rhizobiaceae which includes other nitrogen-fixing bacteria that develop symbioses with legumes. In a symbiotic relationship, the bacteria produce fixed nitrogen compounds for the plant in exchange for a carbon source (photosynthate) for energy and growth of the bacteria.

*Pseudomonas diazotrophicus* is a gram-negative, rod-shaped, nitrogen-fixing bacterium isolated from the roots of rice (*Oryza sativa*) (Watanabe et al., *Can. J. Microbiol.*, 33: 670-678 (1987). The present invention is based, at least in part, upon the discovery that *Pseudomonas diazotrophicus* can function as a free-living microorganism and provide biological nitrogen fixation for a large variety of plants.

BRIEF SUMMARY OF THE INVENTION

The invention provides an inoculant comprising *Pseudomonas diazotrophicus* and a carrier.

The invention also provides a method of preparing an inoculant. The method of preparing the inoculant comprises (a) adding *Pseudomonas diazotrophicus* to a liquid broth to form a culture, (b) incubating the culture under conditions to allow the *Pseudomonas diazotrophicus* to grow, and (c) halting the incubation when a desired density of *Pseudomonas diazotrophicus* in the culture has been attained.

The invention further provides a method of inoculating a medium which comprises applying an inoculant comprising *Pseudomonas diazotrophicus* and a carrier to the medium.

The invention also provides a method of producing a plant. The method of producing the plant comprises (a) applying an inoculant comprising *Pseudomonas diazotrophicus* and a carrier to a medium before, substantially concurrent with, or after planting a seed of the plant in the medium, and (b) allowing the medium to be present under conditions which allow the *Pseudomonas diazotrophicus* to fix nitrogen and the seed to mature into the plant.

BRIEF DESCRIPTION OF THE SEVERAL VIEWS OF THE DRAWING(S)

DETAILED DESCRIPTION OF THE INVENTION

Figure 1A:
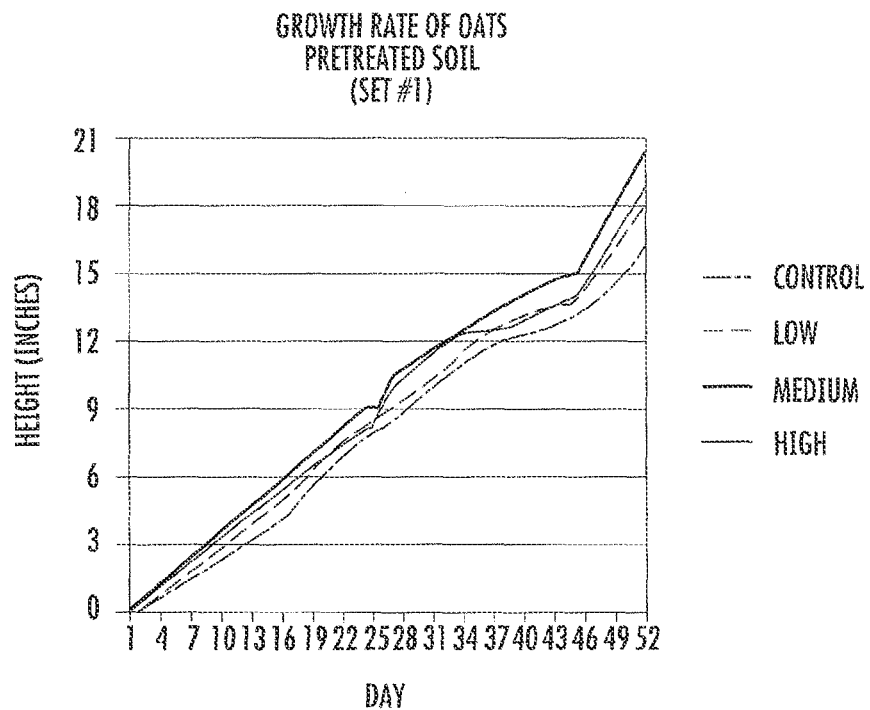
FIGS. 1A and 1B are line graphs depicting the growth rates of oats planted in untreated soil ("control") or in soil pre-treated with an inoculant comprising a culture of *Pseudomonas diazotrophicus* diluted in water at a concentration of 1/200 ("low"), 1/100 ("medium"), or 1/40 ("high").

The invention provides an inoculant comprising *Pseudomonas diazotrophicus* and a carrier therefor.

The carrier can be any agriculturally acceptable wet or dry carrier. The carrier can be a liquid, a solid, a combination of liquid and solid components, or a combination of liquid and/or solid components in a gas (e.g. an aerosol). Any suitable carrier can be used in the context of the invention, provided that the carrier is compatible with the viability of the *Pseudomonas diazotrophicus* microorganism.

In some embodiments, the carrier comprises water. In certain embodiments, the carrier comprises, consists essentially of, or consists of water and residual components of the broth used to grow the *Pseudomonas diazotrophicus* bacteria.

In other embodiments, the carrier comprises solid, e.g., particulate matter. Exemplary solid carriers include humus, peat, charcoal, clay, diatomaceous earth, alginate, perlite, vermiculite, and mixtures thereof. The solid carrier can be in powdered or granular form. The carrier can be a combination of water and one or more of the foregoing solid carriers.

The inoculant can contain any amount of *Pseudomonas diazotrophicus* cells. In certain embodiments, the inoculant comprises $1 \times 10^3$ to $1 \times 10^{12}$ cells/gram of the inoculant. In some embodiments, the inoculant comprises $1 \times 10^4$ to $5 \times 10^9$ cells/gram, $5 \times 10^5$ to $5 \times 10^7$ cells/gram, $1 \times 10^5$ to $1 \times 10^8$ cells/gram, $1 \times 10^6$ to $5 \times 10^8$ cells/gram, $5 \times 10^5$ to $1 \times 10^7$ cells/gram, $1 \times 10^7$ to $1 \times 10^{10}$ cells/gram, $5 \times 10^8$ to $5 \times 10^{10}$ cells/gram, or any range therein.

In some embodiments, the inoculant further comprises one or more adjuvant components, including but not limited to fertilizers, herbicides, pesticides (e.g., insecticides, nematicides, acaricides, fungicides), growth factors, and any other material that will provide a desirable feature for protecting, sprouting and growing the plant, and/or for improving the yield or vigor of the plant. The choice of adjuvant will depend on the crop and the diseases known to be a threat to that crop in the location of interest.

The invention also provides a method of preparing an inoculant. The method of preparing the inoculant comprises (a) adding *Pseudomonas diazotrophicus* to a liquid broth to form a culture, (b) incubating the culture under conditions to allow the *Pseudomonas diazotrophicus* to grow, and (c) halting the incubation when a desired density of *Pseudomonas diazotrophicus* in the culture has been attained.

The *Pseudomonas diazotrophicus* microorganism can be obtained from any source. For example, *Pseudomonas diazotrophicus* is commercially available from American Type Culture Collection (Manassas, Va.) as ATCC® 35402™. The inoculant can be prepared from a frozen stock of *Pseudomonas diazotrophicus* bacteria, or the inoculant can be prepared from an agar plate containing colonies of *Pseudomonas diazotrophicus* bacteria.

The liquid broth can be any liquid which supports the growth of the *Pseudomonas diazotrophicus*. The liquid broth typically comprises water, one or more carbon sources, one or more nitrogen sources, and one or more inorganic salts. For example, the liquid broth can comprise water, glucose, glycerol, vitamins, minerals, amino acids, peptides, and/or proteins. The liquid broth can be defined, i.e., having known quantities of all ingredients. The liquid broth also can be undefined, i.e., having complex ingredients such as yeast extract, casein hydrolysate, peptone, and/or beef extract which contain many components in unknown quantities. One of ordinary skill in the art can vary the composition of the liquid broth to achieve desired *Pseudomonas diazotrophicus* growth characteristics.

The incubation temperature can be in the range of 20° C. to 40° C. In certain embodiments, the incubation temperature is in the range of 24° C. to 26° C. The culture can be incubated with or without shaking. One of ordinary skill in the art also can vary the incubation conditions in order to achieve desired *Pseudomonas diazotrophicus* growth characteristics.

The incubation preferably is halted during log phase growth or early stationary phase. The density of the culture can be assessed visually or by measuring the optical density at 600 nm (OD600) in a spectrophotometer. In certain embodiments, the incubation is halted when the density of *Pseudomonas diazotrophicus* in the culture is in the range of $1\times10^6$ to $1\times10^{12}$ cells/mL. In some embodiments, the incubation is halted when the density of *Pseudomonas diazotrophicus* in the culture is in the range $5\times10^6$ to $5\times10^{11}$ cells/mL, $1\times10^7$ to $1\times10^{11}$ cells/mL, $1\times10^8$ to $5\times10^{10}$ cells/mL, or $5\times10^8$ to $1\times10^{10}$ cells/mL, or any range therein. The incubation can be halted by reducing the temperature of the culture to a temperature in the range of 2-8° C. Alternatively, or additionally, the incubation can be halted by concentrating the culture by centrifugation, discarding the supernatant, and freezing the concentrated *Pseudomonas diazotrophicus* at a temperature in the range of −20 to −80° C.

The invention also provides a method of inoculating a medium which comprises applying an inoculant comprising *Pseudomonas diazotrophicus* and a carrier to the medium. Generally, the medium is intended for the cultivation of a plant. Thus, in some embodiments, the medium comprises a plant or a seed of a plant.

The invention also provides a method of producing a plant. The method of producing the plant comprises (a) applying an inoculant comprising *Pseudomonas diazotrophicus* and a carrier to a medium before, substantially concurrent with, or after planting a seed of the plant in the medium, and (b) allowing the medium to be present under conditions which allow the *Pseudomonas diazotrophicus* to fix nitrogen and the seed to mature into the plant. In some embodiments, the method includes an additional step (c) of harvesting the plant.

The method of the invention can be used to produce any plant. Preferably, the plant is cultivated on a commercial scale and serves as a source of feed, food, fiber, or other chemical compound. Plants which can be produced using the method of the invention include, but are not limited to corn, oat, wheat, barley, rye, rice, beans, peas, clover, alfalfa, sugar cane, sugar beets, tobacco, cotton, rapeseed (canola), sunflower, safflower, and sorghum. In certain embodiments, the plant comprises, consists essentially of, or consists of corn. In other embodiments, the plant comprises, consists essentially of, or consists of oat. In some embodiments, the plant does not comprise rice (e.g., *Oryza sativa*) or a legume.

The medium can be solid, liquid, or semi-solid. In certain embodiments, the medium is soil.

In other embodiments, the medium is a hydroponic solution. The hydroponic solution can be static, or the hydroponic solution can be circulating. The hydroponic solution can be aerated, or the hydroponic solution can be unaerated. In some embodiments, the hydroponic solution comprises perlite, gravel, mineral wool, or expanded clay.

The hydroponic solution may contain water and plant nutrients, such as calcium (Ca) (e.g., $Ca^{2+}$), magnesium (Mg) (e.g., $Mg^{2+}$), potassium (K) (e.g., $K^+$), nitrogen (N) (e.g., $NO_3^-$), sulfur (S) (e.g., $SO_4^{2-}$), phosphate (PO) (e.g., $H_2PO_4^-$), iron (Fe), manganese (Mn), copper (Cu), zinc (Zn), boron (B), chlorine (Cl), and/or nickel (Ni). The plant nutrients may be provided, for example, in the form of potassium nitrate, calcium nitrate, potassium phosphate, and/or magnesium sulfate. The hydroponic solution may further comprise additional elements, such as chelating agents or humic acids.

The inoculant comprising *Pseudomonas diazotrophicus* and a carrier can be applied using any suitable technique known in the art. For example, a liquid inoculant can be applied to soil by spraying or dusting, whereas a solid inoculant can be applied to soil by knifing. An inoculant can be applied to a hydroponic solution by dilution or mixing.

In some embodiments, the inoculant is applied before a seed is planted in the medium. In other embodiments, the inoculant in applied substantially concurrent with (e.g., at the same time, or shortly after) seed planting. For example, an inoculant can be combined with seeds, e.g., by mixing or slurrying, prior to planting the seeds. In other embodiments, the inoculant is applied after seed planting (e.g., after sprouting).

In some embodiments, the inoculant is applied only one time. In other embodiments, the inoculant is applied more than one time, e.g., 2 times, 3 times, 4 times, 5 times, 6 times, 7 times, or any range therein, prior to, substantially concurrent with, and/or after seed planting.

The amount of inoculant to be applied to the medium, as well as the concentration of *Pseudomonas diazotrophicus* cells within the inoculant, can be determined empirically by one of ordinary skill in the art. In some embodiments, the inoculant is a liquid inoculant comprising $1\times10^6$ to $1\times10^{10}$ *Pseudomonas diazotrophicus* cells per mL which is applied at a rate of 0.1-50 gallons of inoculant per acre of soil, e.g., 1-5 gallons per acre of soil, 0.5-10 gallons per acre of soil, 2-20 gallons per acre of soil, 10-30 gallons per acre of soil, or any range therein. In other embodiments, the inoculant is a liquid inoculant comprising $1\times10^6$ to $1\times10^{10}$ *Pseudomonas diazotrophicus* cells per mL which is applied to a hydroponic solution in an amount of 0.5-50% by volume, e.g., 5-25% by volume, 10-20% by volume, 20-30% by volume, 1-10% by volume, 15-45% by volume, 25-40% by volume, or any range therein.

In certain embodiments, the inventive method of producing a plant results in improved germination, sprouting, growth, vigor, and/or survival of the plant as compared to a method of producing the same plant under the identical conditions except lacking the application of an inoculant comprising *Pseudomonas diazotrophicus* and a carrier.

In other embodiments, the inventive method of producing a plant results in an improved yield of a crop of the plant as compared to a method of producing the same plant under the identical conditions except lacking the application of an inoculant comprising *Pseudomonas diazotrophicus* and a carrier. In certain embodiments, the yield of a crop of a plant produced by the method of the invention is increased by at least 0.5%, e.g., 1% or more, 3% or more, 5% or more, 10% or more, 20% or more, or 30% or more. Alternatively, or in addition, the yield of a crop of a plant produced by the method of the invention is increased by 50% or less, e.g., 45% or less, 35% or less, 25% or less, 15% or less, or 7% or less. Thus, the increase in the yield of a crop of a plant produced by the method of the invention can be bounded by any two of the above endpoints. For example, the yield of a crop of a plant produced by the method of the invention can be increased by 0.5-50%, 1-25%, 5-35%, 10-50%, or 20-25% as compared to the yield of a crop of the same plant produced under the identical conditions except lacking the application of an inoculant comprising *Pseudomonas diazotrophicus* and a carrier.

The following examples further illustrate the invention but, of course, should not be construed as in any way limiting its scope.

EXAMPLE 1

This example demonstrates a method for preparing an inoculant comprising *Pseudomonas diazotrophicus* and a carrier.

A growth media was prepared by dissolving dry beef base and peptone in water, and sterilizing by autoclaving at 250° C. for 15 minutes. The growth media was cooled, transferred to a flask, and inoculated with a swab of *Pseudomonas diazotrophicus*. The culture was incubated until sufficient growth of *Pseudomonas diazotrophicus* had been attained. The culture was transferred to a refrigerator to halt the growth of the *Pseudomonas diazotrophicus*.

To prepare the inoculant, the culture of *Pseudomonas diazotrophicus* was diluted with water at a concentration of 1/200, 1/100, or 1/40.

This example provides an inoculant comprising *Pseudomonas diazotrophicus* and a carrier, as well as a method for its production.

EXAMPLE 2

This example demonstrates a method of producing a plant by applying an inoculant comprising *Pseudomonas diazotrophicus* and a carrier to a medium before planting a seed of the plant in the medium, and allowing the medium to be present under conditions which allow the *Pseudomonas diazotrophicus* to fix nitrogen and the seed to mature into the plant.

Trays of soil were treated with an inoculant comprising *Pseudomonas diazotrophicus* diluted in water at a concentration of 1/200 ("low"), 1/100 ("medium"), or 1/40 ("high").

For comparison, control trays were treated with water only. Seeds of oat or corn were planted into the trays, and the trays were placed into a greenhouse. Each tray contained 12 seeds, and each experimental group was performed in duplicate (i.e., Set #1 and Set #2). The growth and health of the plants were recorded at regular intervals. Control and treated trays were subjected to the same conditions, except for the *Pseudomonas diazotrophicus* exposure.

Figure 1B:
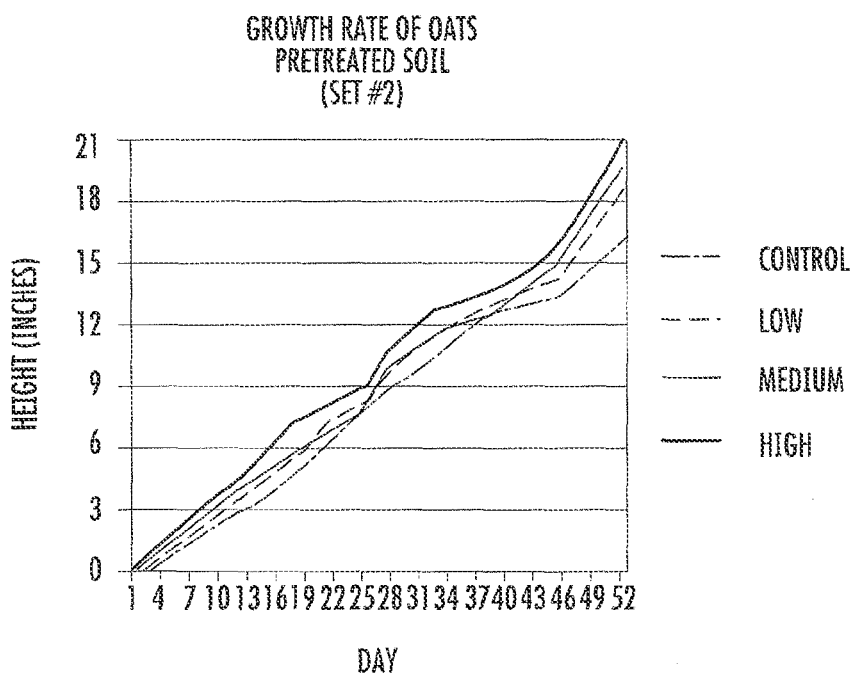

The height of each plant was measured every three days, and the average plant height for each experimental group was calculated. The growth rate of oats planted into soil which was pretreated with an inoculant comprising *Pseudomonas diazotrophicus* and water was increased for all concentrations of *Pseudomonas diazotrophicus* as compared to control (FIGS. 1A and 1B). Pretreatment of the soil with a 1/100 dilution of *Pseudomonas diazotrophicus* produced the fastest oat growth rate (FIGS. 1A and 1B, "medium").

Figure 2A:
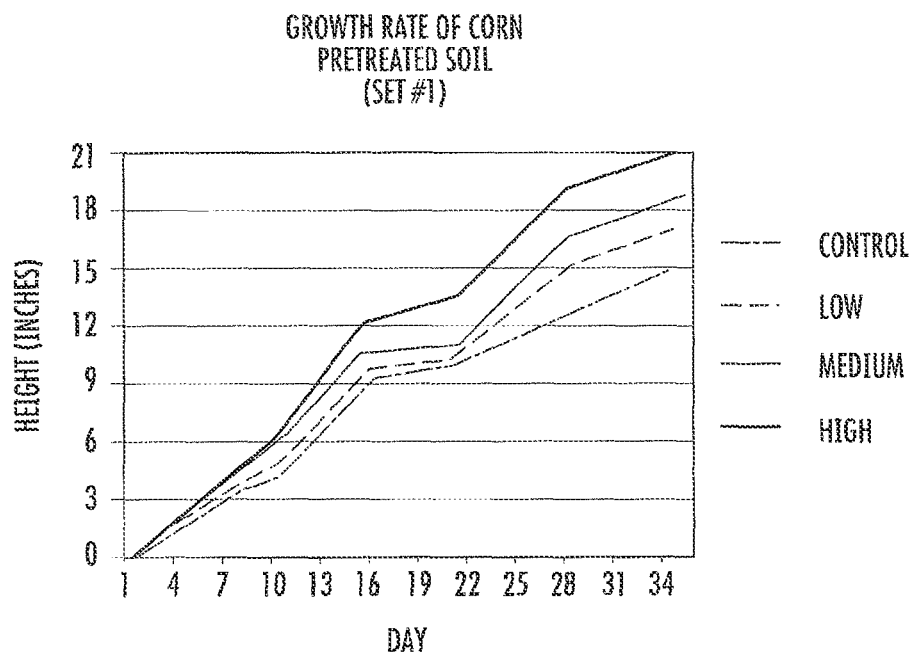
FIGS. 2A and 2B are line graphs depicting the growth rates of corn planted in untreated soil ("control") or in soil pre-treated with an inoculant comprising a culture of *Pseudomonas diazotrophicus* diluted in water at a concentration of 1/200 ("low"), 1/100 ("medium"), or 1/40 ("high").
Figure 2B:
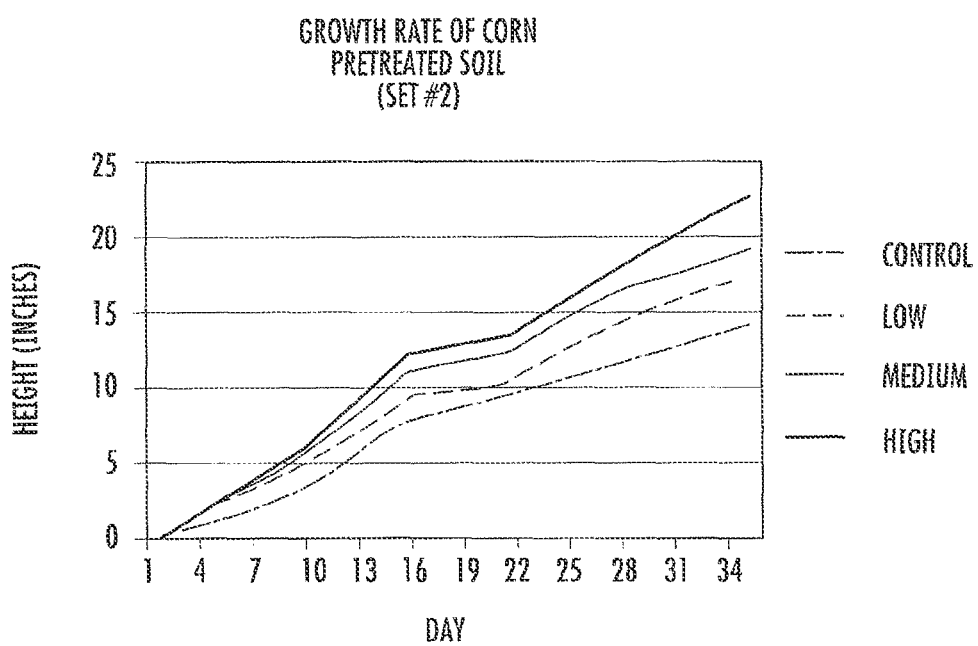

The growth rate of corn planted into soil which was pretreated with an inoculant comprising *Pseudomonas diazotrophicus* and water was increased for all concentrations of *Pseudomonas diazotrophicus* as compared to control (FIGS. 2A and 2B). Pretreatment of the soil with a 1/40 dilution of *Pseudomonas diazotrophicus* produced the fastest corn growth rate (FIGS. 2A and 2B, "high").

The results of this example demonstrate that pretreatment of soil with an inoculant comprising *Pseudomonas diazotrophicus* and water enhances the growth of two different plant types.

EXAMPLE 3

This example demonstrates a method of producing a plant by applying an inoculant comprising *Pseudomonas diazotrophicus* and a carrier to a medium after planting a seed of the plant in the medium, and allowing the medium to be present under conditions which allow the *Pseudomonas diazotrophicus* to fix nitrogen and the seed to mature into the plant.

Trays of soil were planted with oat seeds and placed into a greenhouse. After the oat plants had emerged from the soil, the trays were treated either with an inoculant comprising *Pseudomonas diazotrophicus* diluted in water at a concentration of 1/100 ("medium"), or water only ("control"). Each tray contained 12 oat seeds, and each experimental group was performed in duplicate (i.e., Set #1 and Set #2).

Figure 3A:
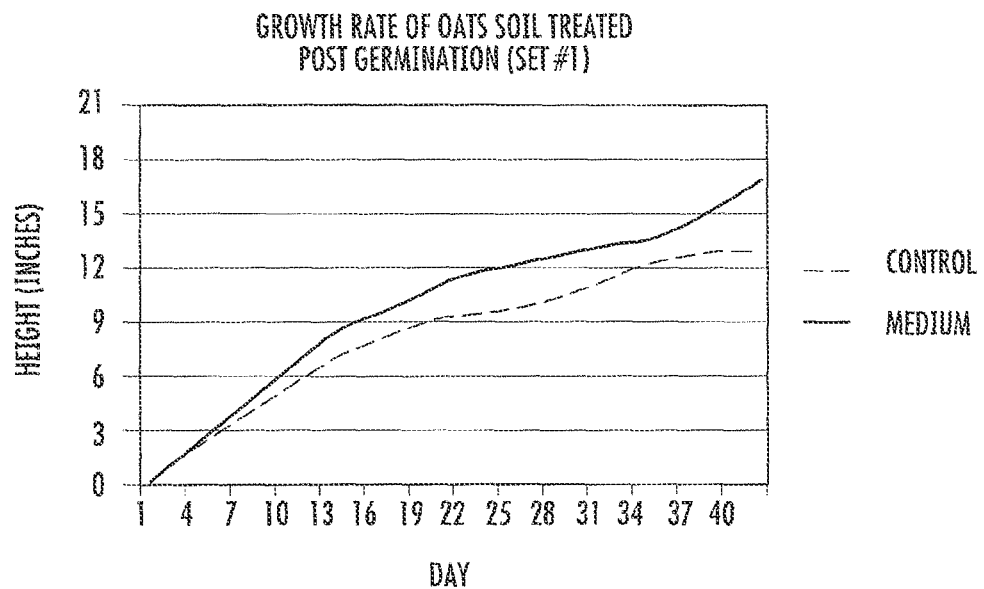
FIGS. 3A and 3B are line graphs depicting the growth rates of oats grown in untreated soil ("control") or in soil treated after germination with an inoculant comprising a culture of *Pseudomonas diazotrophicus* diluted in water at a concentration of 1/100 ("medium").
Figure 3B:
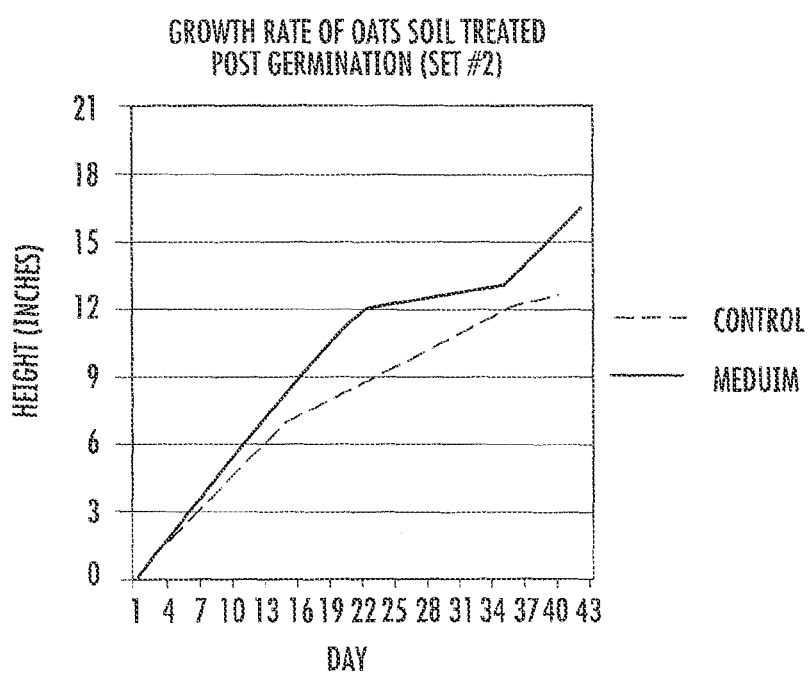

The height of each oat plant was measured every three days, and the average oat plant heights for the *Pseudomonas diazotrophicus*-treated and control groups were calculated. The growth rate of oat plants which received the *Pseudomonas diazotrophicus* inoculant after emerging from the soil was increased as compared to control (FIGS. 3A and 3B).

The results of this example demonstrate that applying an inoculant comprising *Pseudomonas diazotrophicus* and water to soil comprising young oat plants enhances the growth of the oat plants.

EXAMPLE 4

This example demonstrates that the yield of a corn crop is increased following application of an inoculant comprising *Pseudomonas diazotrophicus* and a carrier.

The effect of an inoculant comprising *Pseudomonas diazotrophicus* was tested in a plot of corn grown in soil which was deficient in nitrogen. To do so, an inoculant comprising approximately one gallon of a saturated culture of *Pseudomo-* nas diazotrophicus was diluted in water and applied to one acre plot in the center of a seven acre area containing corn at the v4 stage of growth.

Figure 4:
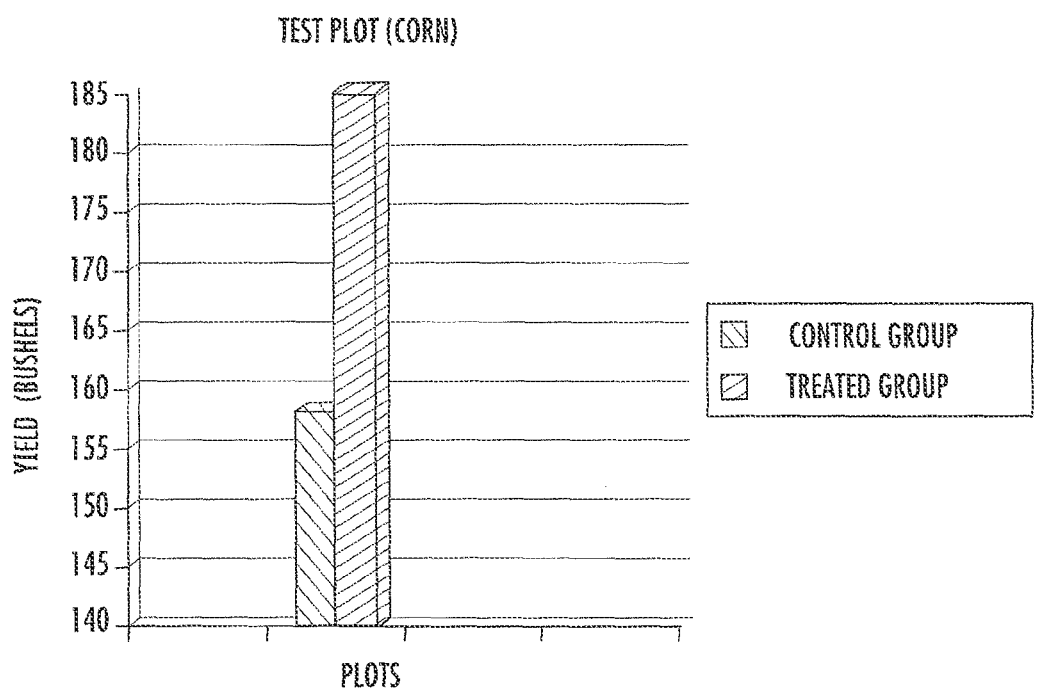
FIG. 4 is a bar graph which depicts the yield of a corn crop grown in untreated soil ("control group") or in soil treated at the v4 stage of corn growth with an inoculant comprising a culture of *Pseudomonas diazotrophicus* diluted in water.

At harvest, the yields from the treated plot and the surrounding control plot were compared. The yield of the corn grown in the Pseudomonas diazotrophicus-treated plot was 17% higher than the yield of the corn grown in the adjacent, untreated control plot (FIG. 4).

This example demonstrates that applying an inoculant comprising Pseudomonas diazotrophicus and water to nitrogen-deficient soil comprising corn plants enhances the yield of the corn crop.

EXAMPLE 5

This example demonstrates that applying an inoculant comprising Pseudomonas diazotrophicus and a carrier to soil increases the nitrogen level in the soil.

Figure 5:
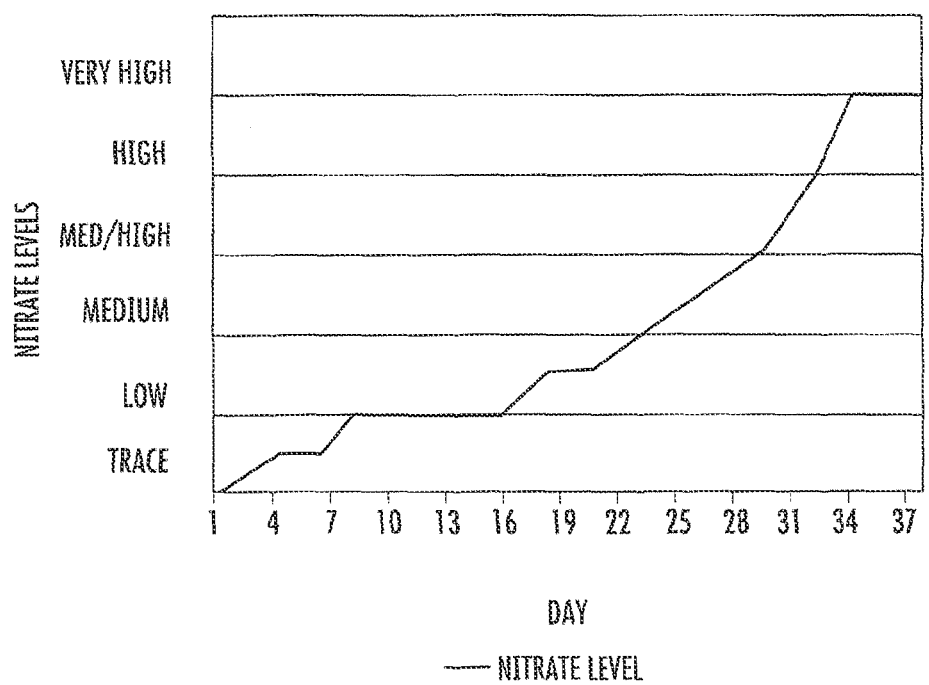
FIG. 5 is a line graph depicting the level of nitrate in soil following application of an inoculant comprising a culture of *Pseudomonas diazotrophicus* diluted in water.

An inoculant comprising Pseudomonas diazotrophicus and water was applied to soil samples which contained no measurable nitrogen. The nitrate level of each soil sample was measured every 2-3 days. There was a marked increase in the amount of nitrate present in the soil following application of the Pseudomonas diazotrophicus-containing inoculant (FIG. 5).

This example demonstrates a direct effect of an inoculant comprising Pseudomonas diazotrophicus and a carrier on soil nitrogen levels.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of producing a plant comprising
   (a) applying a plant inoculant comprising Pseudomonas diazotrophicus and a carrier to a medium before, substantially concurrent with, or after planting a seed of the plant in the medium, and
   (b) allowing the medium to be present under conditions which allow the Pseudomonas diazotrophicus to fix nitrogen and the seed to mature into the plant, thereby producing the plant.

2. The method of claim 1, wherein the carrier comprises water.

3. The method of claim 1, wherein the carrier comprises humus, peat, charcoal, clay, diatomaceous earth, alginate, perlite, vermiculite, or mixtures thereof.

4. The method of claim 1, wherein the plant inoculant further comprises one or more fertilizers, herbicides, pesticides (insecticides, nematicides, acaricides, fungicides), or growth factors.

5. The method of claim 1, wherein the medium is soil.

6. The method of claim 5, wherein the plant inoculant is applied to the soil by spraying, dusting, or knifing.

7. The method of claim 1, wherein the medium is a hydroponic solution.

8. The method of claim 7, wherein the hydroponic solution comprises perlite, gravel, mineral wool, expanded clay, or combinations thereof.

9. The method of claim 1, wherein the plant comprises corn.

10. The method of claim 1, wherein the plant comprises oats.

11. The method of claim 1, wherein the plant is selected from the group consisting of wheat, barley, rye, rice, beans, peas, clover, alfalfa, sugar cane, sugar beets, tobacco, cotton, rapeseed (canola), sunflower, safflower, sorghum, or combinations thereof.

12. The method of claim 1, wherein the plant does not comprise Oryza sativa or a legume.

13. The method of claim 1, further comprising (c) harvesting the plant.

14. The method of claim 1, wherein the plant crop yield is increased compared to the plant crop yield of the same plant produced in the absence of a plant inoculant comprising Pseudomonas diazotrophicus and a carrier.

15. The method of claim 14, wherein the yield is increased by at least 5%.

* * * * *